(No Model.)
G. W. WELLS.
SPRING AND NOSE GUARD FOR EYEGLASSES.
No. 331,465. Patented Dec. 1, 1885.
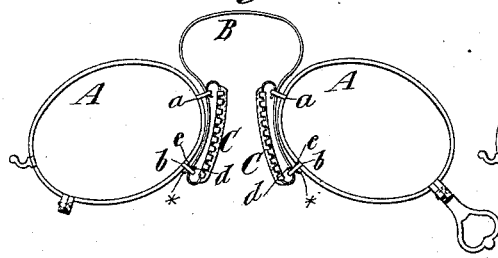
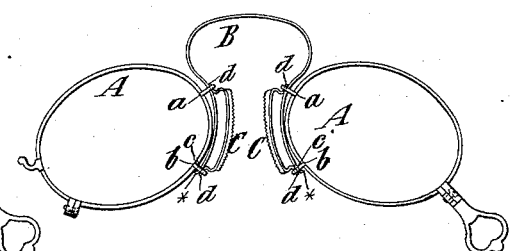
   
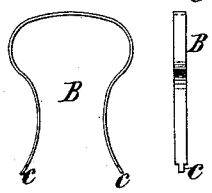 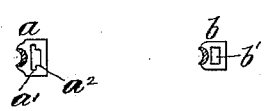
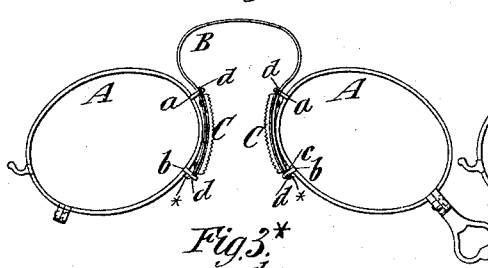
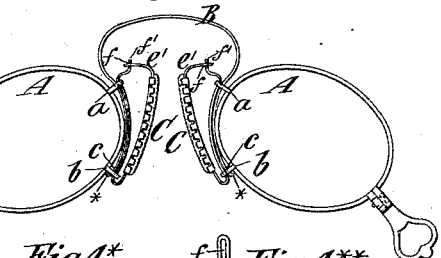
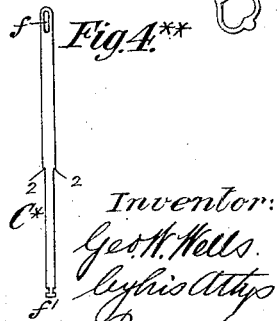

United States Patent Office.

GEORGE W. WELLS, OF SOUTHBRIDGE, MASSACHUSETTS.

SPRING AND NOSE-GUARD FOR EYEGLASSES.

SPECIFICATION forming part of Letters Patent No. 331,465, dated December 1, 1885.

Application filed August 21, 1885. Serial No. 174,935. (No model.)

*To all whom it may concern:*

Be it known that I, GEORGE W. WELLS, of Southbridge, in the county of Worcester and State of Massachusetts, have invented a new and useful Improvement in Springs and Guards for Eyeglasses, of which the following is a specification.

My invention relates to the method of attaching the bow-spring and nose-guards to the eye-wires of eyeglasses; and it consists in novel features of construction and combinations of parts hereinafter described, and pointed out in the claims, whereby I avoid any weakening of the spring by slitting or perforating it for screws, and whereby I enable the parts of the eyeglasses to be assembled and secured together in process of manufacture or renewed, or replaced in case of repair, without any special tools and by any one not a skilled workman.

In the accompanying drawings, Figures 1 and 2 represent eyeglasses differing slightly from each other as to the nose-guard, but both embodying my invention. Figs. 1* and 1ª are perspective views representing two forms of guard which may be used with the glass shown in Fig. 1, and Figs. 2* and 2ª are similar views representing two forms of nose-guard which may be used with the glass shown in Fig. 2. Figs. 3 and 4 represent two other forms of eye-glasses, also embodying my invention. Fig. 3* is a perspective view of one of the nose-guards shown in Fig. 3. Fig. 4* is a perspective view of one of the nose-guards shown in Fig. 4, and Fig. 4** represents the flat strip of metal from which is formed the guard shown in Fig. 4*. Figs. 5 and 6 are respectively edge and side views of the bow-spring which is employed. Figs. 7 and 8 are detail views, on a larger scale, of the upper and lower posts of the eye-wires; and Figs. 9, 10, 11, and 12 illustrate different forms of guard which may be used.

Similar letters of reference designate corresponding parts in all the figures.

In all the examples of my invention, A A designate the eye-wires; B, the spring, and C C the nose-guards. The eye-wires A are provided with upper and lower posts, *a b*, rigidly soldered or otherwise affixed to them in any of the usual ways. These posts may be most cheaply and conveniently made by punching them from plate metal, and they differ from the ordinary posts in having in them holes or slots, which are best shown in Figs. 7 and 8.

The spring B consists of a simple and plain strip, which is made of uniform width from end to end, save at the extreme ends, where it is cut down or reduced in width to form tongues *c*, as best shown in Figs. 5 and 6. The spring is imperforate and of uniform strength from end to end.

The nose-guards C C may be of any of the forms hereinafter particularly referred to, or of any other usual or suitable form. These guards differ from those before used, principally in having at their ends tongues *d*, of less width than the guard proper.

The spring B is connected with the eye-wires A by passing it directly through the opening in the upper post, *a*, and inserting its tongue *c* into the opening in the lower post, *b*, and the guard is connected with the eye-wire by having its tongue *d* inserted into the openings in both posts. The upper post, *a*, has a slot portion, *a'*, of sufficient width to receive the whole width of the spring, and having an offset or slot-like portion, $a^2$, of a width only sufficient to receive the tongue *d* at the upper end of the guard. The lower post, *b*, has a slot or opening, *b'*, of sufficient width only to receive the tongues *c d* at the lower ends of the spring and guard. The lower end of the spring at the termination of the tongue is bent slightly in the plane of the eye-wires or inward toward the eye-wires, as shown at *, and while this bend may be readily inserted through the slot *b'* in the post *b* before the nose-guard is attached, it cannot pass through or leave said slot after the attachment of the nose-guard. The spring B having been passed through the slot *a'* in the upper post, *a*, its tongue *c* is inserted into the slot in the lower post, *b*, and the shoulders formed at the root of the tongue prevent its slipping through the post *b* beyond the extent to which it is inserted. The nose-guard may then be sprung or deflected sufficiently to permit of its upper end being inserted into the slot portion $a^2$ in the upper post, *a*, and its lower end into the slot or opening *b'* in the lower post. The natural elasticity of the guard C will hold its tongues *d* in engagement with the posts, and the nose-guard when in place prevents the disengagement of the spring-tongue *c* from the post *b*.

The guards C (shown in Figs. 1* 1ª) both have their ends reverted or turned backward relatively to the guard, and provided with the tongues d. These two guards differ from each other only in respect to their bends. The guard shown in Fig. 1* has bends e, of equal width or extent at both its upper and lower ends, while the guard shown in Fig. 1ª has a much larger or broader bend at the upper than at the lower end. To attach these guards, the one end may be hooked into the post a from the top thereof, and by a slight pressure the guard may be sprung sufficiently to enable the lower end to be hooked into the post b from the under side thereof.

The guard shown in Figs. 2* and 2ª both have their ends bent inward, and then upward and downward, and provided with tongues d, which are presented upward and downward. The guard shown in Fig. 2* has its bent portions e of equal length, while the guard shown in Fig. 2ª has its upper bent portion longer than the lower, so as to offset the guard more from the eye-wire at the upper end than at the lower end. After the tongue d at one end—the upper end, for instance—has been inserted into the post a from the under side thereof, the guard may be sprung sufficiently to permit of its being inserted into the lower post from the upper side thereof.

The guard shown in Fig. 3* has a tongue, d, at each end, and consists simply of a curved strip, which conforms to the curvature of the spring between the posts a and b, as shown in Fig. 3.

The guard shown in Figs. 4 and 4* is formed from a piece or strip of metal, such as is shown in Fig. 4**, having a portion of its length C* of reduced width. At the broad or wider end of the strip is a slot, f, and at the narrower end it is notched at each side to form a T-shaped head, f', which, by twisting the portion C* slightly, may be engaged with the slot f, and will then be returned by the resilience of the spring-strip to a position transversely across the slot. The upper or slotted end of the strip is bent, as shown at e', and the strip is then passed downward through the posts a b until the shoulders 2 strike against the lower post, b. The narrower portion, which projects through and beyond the post b, is then bent upward and backward, and the T-shaped head f' is inserted through the slot f.

The guards shown in Figs. 9 and 10 are made and applied in the same way as those shown in Figs. 1* 1ª, except that they have the portions bearing on the nose offset from the plane in which are their tongued ends, so that the glasses will be farther forward from the face than when the nose-bearing surfaces of the guards are in the same plane with the glasses. The guard shown in Fig. 9 is offset at the upper end only, as shown at g, while the guard shown in Fig. 10 is offset at both its upper and lower ends, as shown at g.

The guards shown in Figs. 11 and 12 are very like those shown in Figs. 2* 2ª, save that the guard shown in Fig. 12 is offset at the upper end, as shown at g, by bending the metal in the direction of its width, and the guard shown in Fig. 11 is offset at both its upper and lower ends by so bending the metal at g.

All the guards shown may be faced with rubber, shell, cork, or any other suitable material secured to them in any of the ways commonly practiced in the manufacture of eye-glasses.

It will be seen from the above description that any of these guards and springs will interchange one with another, and hence the optician, by having a suitable assortment of springs and guards, is able to fit any person promptly and without any work with tools or appliances. All the guards, except that shown in Figs. 4, 4*, 4**, may be put in place either end up, as they have like tongues at the ends.

Neither the spring nor guards are weakened by perforating them for screws or slitting them, and hence a narrower and lighter spring and guard may be used, if desired, and will have equal or greater strength than the usual spring and guards perforated for the reception of screws.

What I claim as my invention, and desire to secure by Letters Patent, is—

1. The combination, with the eye-wires provided with upper and lower slotted posts, of a spring made imperforate throughout, passing through the upper posts, and having at the ends tongues less in width than the body of the spring, which enter the lower posts and are bent in the plane of the eye-wires to secure them in the lower posts, whereby the spring is secured to the eye-wires without screws, rivets, or other means, substantially as herein described.

2. The combination, with an eye-wire provided with slotted posts, of a spring passing through the upper post and having at the end a bent tongue entering the slot in the lower post, and a guard fitting the slots in the posts and serving to secure the bent tongue of the spring from disengagement with the slotted lower post, substantially as herein described.

3. A spring for eyeglasses, made imperforate throughout, and provided at the ends with tongues c, less in width than the body of the spring, and bent transversely to the width of the spring, as at *, substantially as herein described.

4. The combination, with an eye-wire, having slotted posts, of a nose-guard having at the ends tongues, which are sprung into engagement with the posts, and are retained in engagement therewith by the elasticity of the nose-guard and without screws or rivets, substantially as herein described.

5. The post a for eyeglass-frames, having a slotted opening composed of two portions, a' a², of unequal width, substantially as and for the purpose herein described.

Witnesses:     GEORGE W. WELLS.
  H. C. CADY,
  AUGUSTUS COOK.